United States Patent
Butzmann et al.

(10) Patent No.: US 9,841,798 B2
(45) Date of Patent: Dec. 12, 2017

(54) BATTERY, BATTERY CONTROLLER, AND METHOD FOR THE SECURED DIGITAL TRANSMISSION OF CURRENT MEASUREMENT VALUES

(71) Applicant: Robert Bosch GmbH, Stuttgart (DE)

(72) Inventors: Stefan Butzmann, Schalksmühle (DE); Sven Bergmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/030,654

(22) PCT Filed: Oct. 9, 2014

(86) PCT No.: PCT/EP2014/071670
§ 371 (c)(1),
(2) Date: Apr. 20, 2016

(87) PCT Pub. No.: WO2015/058970
PCT Pub. Date: Apr. 30, 2015

(65) Prior Publication Data
US 2016/0259386 A1    Sep. 8, 2016

(30) Foreign Application Priority Data
Oct. 24, 2013   (DE) .................. 10 2013 221 583

(51) Int. Cl.
*G06F 7/02* (2006.01)
*H03M 13/00* (2006.01)
(Continued)

(52) U.S. Cl.
CPC ............ *G06F 1/263* (2013.01); *G06F 11/079* (2013.01); *G06F 11/0736* (2013.01);
(Continued)

(58) Field of Classification Search
CPC .. G06F 1/263; G06F 11/0736; G06F 11/0751; G06F 11/079; G06F 13/4282; G08C 25/00; H04L 25/4915
See application file for complete search history.

(56) References Cited

U.S. PATENT DOCUMENTS

| 5,113,410 A | 5/1992 | Hamano et al. |
| 2010/0259221 A1 | 10/2010 | Tabatowski-Bush |

FOREIGN PATENT DOCUMENTS

| DE | 3422363 | 12/1984 |
| DE | 19918610 | 10/2000 |

(Continued)

OTHER PUBLICATIONS

International Search Report for Application No. PCT/EP2014/071670 dated Feb. 4, 2015 (English Translation, 2 pages).

*Primary Examiner* — Sam Rizk
(74) *Attorney, Agent, or Firm* — Michael Best & Friedrich LLP

(57) ABSTRACT

The invention relates to a method for the secured digital transmission of current measurement values and to a battery (1) and a battery controller (10) which are suitable for carrying out the method. The method has the steps of detecting (S1, S2) an amplitude of a battery current ($I_B$) in a battery (1) using a first and a second sensor (2, 3), generating (S3, S4) a first and a second bit sequence, each of which describes the detected amplitude, generating a mirrored second bit sequence (21) by reversing (S5) a sequence of the bits provided by the second bit sequence (20), simultaneously transmitting (S6) the first bit sequence via a first data bus (5) and the mirrored second bit sequence (21) via a second data bus (6) to a battery controller (10), generating a second bit sequence (20) by reversing (S7) a sequence of the bits provided by the mirrored second bit sequence (21) after the simultaneous transmission (S6), and (Continued)

finally detecting (S8) a possible error in the first bit sequence or the second bit sequence (20) by comparing the first bit sequence (20) with the second bit sequence (21). Transmission faults are thus detected in particular in a transmission path between the sensors of the battery and the battery controller, said faults being caused by a common disturbance. Additionally, faults can also be detected which are caused by a disturbance that only affects one of the sensors or a part of the transmission path.

10 Claims, 4 Drawing Sheets

(51) Int. Cl.
| | | |
|---|---|---|
| *G06F 1/26* | (2006.01) | |
| *G08C 25/00* | (2006.01) | |
| *H04L 25/49* | (2006.01) | |
| *H04Q 9/00* | (2006.01) | |
| *G06F 11/07* | (2006.01) | |
| *G06F 13/42* | (2006.01) | |
| *H04L 12/40* | (2006.01) | |

(52) U.S. Cl.
CPC ...... *G06F 11/0751* (2013.01); *G06F 13/4282* (2013.01); *G08C 25/00* (2013.01); *H04L 12/40* (2013.01); *H04L 25/4915* (2013.01); *H04Q 9/00* (2013.01); *H04L 2012/40215* (2013.01); *H04L 2012/40234* (2013.01); *H04L 2012/40273* (2013.01); *H04Q 2209/30* (2013.01)

(56) References Cited

FOREIGN PATENT DOCUMENTS

| | | |
|---|---|---|
| DE | 10216605 | 10/2003 |
| DE | 102010016175 | 8/2011 |
| DE | 102011079126 | 1/2013 |

BATTERY, BATTERY CONTROLLER, AND METHOD FOR THE SECURED DIGITAL TRANSMISSION OF CURRENT MEASUREMENT VALUES

BACKGROUND OF THE INVENTION

The present invention relates to a battery comprising a device for the digital transmission of current measurement values and to a battery controller comprising a device for receiving a digital transmission of current measurement values.

In battery systems, great importance is being placed on the measurement of battery current in determining the charging state as well as in ensuring a reliable operation, in order to prevent a potentially dangerous condition. There is a plurality of dangers which can be attributed to an inadmissible current. Such dangers include inter alia an overload of the battery, an excess current or a lithium plating.

In the event of overloading the battery, more current is provided to the battery than the current state of the battery allows (e.g. due to the current temperature or the state of ageing of the battery). This can possibly lead to the battery overheating and can end in a dangerous situation.

In the event of excess current, more current is provided by the battery than the individual cells can deliver (above the specification). This can also result in the battery overheating.

Charging the battery at very low temperatures with high currents causes metallic lithium to deposit. This is referred to as lithium plating. Lithium plating can also be dangerous because this effect can lead to a short circuit in the battery. A monitoring of the lithium plating is particularly critical because just a few amperes too much can lead to an undetected fault in the battery.

Due to the dangers described and others, it is necessary to reliably measure a current. A safety rating of the current measurement according to ASIL C (ISO26262) ensues from a danger and risk analysis. A single channel measurement (i.e., for example, only with one sensor) is extremely difficult to implement. That is why the following solutions are typically in use: the use of additional monitoring hardware on a current sensor (e.g. by means of comparators), which triggers at a certain amount of excess current or the use of two different current sensors (e.g. a Hall sensor or a shunt-based sensor).

When using additional monitoring hardware, it has been proven disadvantageous that sensors having such an integrated solution are usually expensive proprietary developments which are developed only for electric vehicles and are manufactured in small quantities. In addition, an application comprising such an additional monitoring hardware is generally not flexible enough with regard to the setting of excess current limits. Hence, a time dependent or temperature dependent adaptation is, e.g., not possible.

The use of two different sensor technologies, respectively from two different measurement methods, is the most reliable method to date; however, two different components have to also be installed in this case, which leads to increased costs.

If two identical current sensors are used, faults being caused by a common disturbance could occur when transmitting a detected current, e.g., as a result of external influences (EMV, etc.).

The German patent application DE3422363C2 describes a method for transmitting data in motor vehicles according to the prior art. In said method, data signals are sent as a normal and as an inverted bit sequence. In this case, inverted means that a logical "1" is transmitted as a logical "0" and a logical "0" as a logical "1". The fault detection results from a comparison of the normal and the inverted bit sequence.

The German patent application DE102011079126A1 describes a battery management system according to the prior art comprising a plurality of measuring units as well as a plurality of second measuring units which are each associated with at least one battery module of a battery in order to acquire a measured variable. The measuring units transmit the measured variables via two separate data lines.

The German patent application DE102011079126A1 describes a battery monitoring device according to the prior art. The transmission of sensor data takes place in said device via a primary serial bus and a redundant secondary serial bus.

SUMMARY OF THE INVENTION

The inventive battery having a device for the digital transmission of current measurement values comprises a first sensor which is suitable for detecting an amplitude of a battery current and which is equipped to generate a first bit sequence, which describes the amplitude detected by the first sensor, a second sensor which is suitable for detecting the amplitude of the battery current and which is equipped to generate a second bit sequence, which describes the amplitude detected by the second sensor, a mirroring unit which is coupled to the second sensor such that the second bit sequence is transmitted by the second sensor to said mirroring unit and which is equipped to generate a mirrored bit sequence by reversing a sequence of the bits provided by the second bit sequence, wherein a first bit of the second bit sequence becomes a last bit of the mirrored second bit sequence and a last bit of the second bit sequence becomes a first bit of the mirrored second bit sequence, and a transmission interface which is equipped to simultaneously facilitate a coupling of the first bit sequence from the first sensor into a first data bus and a coupling of the mirrored second bit sequence from the mirroring unit into a second data bus. Such a battery is advantageous because a measurement value for the amplitude of the battery current is provided by the same, which measurement value can be verified by a simple analysis. A cost effective current detection having a high degree of fault security is thus facilitated.

The inventive battery controller comprising a device for receiving a digital transmission of current measurement values comprises a receiving interface which is equipped to decouple a first bit sequence from a first data bus and simultaneously to decouple a mirrored second bit sequence from a second data bus, an anti-mirroring unit which is equipped to generate a second bit sequence by reversing a sequence of the bits provided by the mirrored second bit sequence, wherein a first bit of the mirrored second bit sequence becomes a last bit of the second bit sequence and a last bit of the mirrored second bit sequence becomes a first bit of the second bit sequence, and a control unit which is equipped to detect a possible error in the first bit sequence or the second bit sequence by comparing the first bit sequence with the second bit sequence. Such a battery controller is advantageous because a measurement value for the amplitude of a battery current is verified by means of a simple analysis by said battery controller. A cost effective fault detection is therefore possible.

The method according to the invention for the secured digital transmission of current measurement values comprises the steps of detecting an amplitude of a battery current in a battery using a first sensor, detecting the amplitude of the battery current in the battery using a second sensor, generating a first bit sequence which describes the amplitude detected using the first sensor, generating a second bit sequence which describes the amplitude detected using the second sensor, generating a mirrored second bit sequence by reversing a sequence of the bits provided by the second bit sequence, wherein a first bit of the second bit sequence becomes a last bit of the mirrored second bit sequence and a last bit of the second bit sequence becomes a first bit of the mirrored second bit sequence, simultaneously transmitting the first bit sequence via a first data bus to a battery controller and the mirrored second bit sequence via a second data bus to the battery controller, generating the second bit sequence by reversing a sequence of the bits provided by the mirrored second bit sequence, wherein a first bit of the mirrored second bit sequence becomes a last bit of the second bit sequence and a last bit of the mirrored second bit sequence becomes a first bit of the second bit sequence, and detecting a possible error in the first bit sequence or the second bit sequence by comparing the first bit sequence with the second bit sequence. The method is advantageous because transmission faults can particularly be detected in a transmission path between the sensors of the battery and the battery controller by means of said method, said faults being caused by a common disturbance. Additionally, faults can also be detected which are caused by a disturbance that only affects one of the sensors or one of the transmission paths.

It is advantageous if the first sensor and the second sensor are identically constructed sensors with regard to detecting the amplitude of the battery current and generating the bit sequence. In this way, a cost savings can be achieved by using identical components. In addition, the measurement values ascertained by the identically constructed sensors are comparable. Errors are prevented which are caused by deviating behavior due to the sensor characteristics.

It is additionally advantageous if the first data bus and/or the second data bus is/are a LIN bus or a CAN bus. These bus systems are typically used in the automotive field. A combination of an inventive battery or an inventive battery controller with bus systems which are both standard and proven to be reliable is therefore facilitated. By using standard components, a cost savings can in turn be achieved. It is particularly advantageous if the first data bus and the second data bus are based on the same bus system. A simultaneous transmission of the first and the second bit sequence can therefore be achieved in this way. A fault being caused by a common disturbance can therefore be particularly reliably detected.

It is also advantageous if the first sensor and/or the second sensor comprise(s) a Hall sensor or a shunt-based sensor because these sensors have a high degree of reliability in an automotive application and can moreover be obtained as corresponding standard components.

The second sensor preferably comprises the mirroring unit. In this way, a component is created which can be directly combined with a bus controller that is available as a standard component. A cost advantage is thereby achieved.

The control unit is preferably equipped to detect a possible error in the first bit sequence or the second bit sequence by means of a bitwise comparison of the first bit sequence with the second bit sequence. Such a bitwise comparison can be implemented in a simple and thus in turn robust as well as cost effective manner (e.g. by means of a logic gate).

The control unit is likewise preferably equipped to generate a first analogous value from the first bit sequence and a second analogous value from the second bit sequence and to detect a possible error in the first bit sequence or the second bit sequence by means of a comparison between the first analogous value and the second analogous value. Such a bitwise comparison can be implemented in a simple and thus in turn robust as well as cost effective manner (e.g. by means of a combination of two DA converters with a comparator).

The battery according to the invention can comprise the battery controller according to the invention. In particular, the battery also comprises the first and the second data bus.

The battery is in particular a vehicle or, respectively, a traction battery.

BRIEF DESCRIPTION OF THE DRAWINGS

Exemplary embodiments of the invention are described below in detail with reference to the accompanying drawings. In the drawings.

DETAILED DESCRIPTION

The present invention describes a system, with which a current detection is possible using a plurality of identical sensors according to ASIL C. In so doing, the transmission via a data bus is particularly ensured by means of a modified digital transmission protocol.

Figure 1:
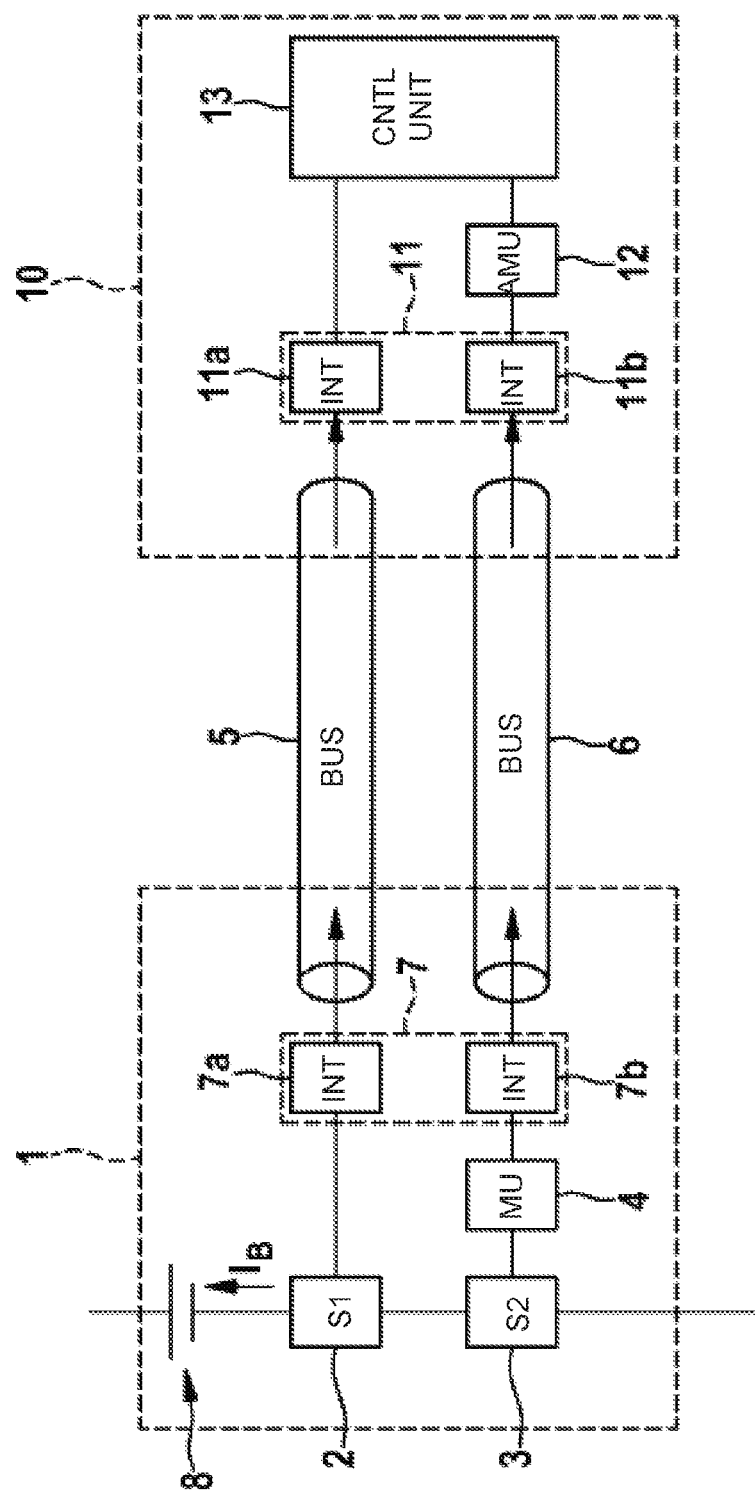
FIG. 1 shows a battery comprising a device according to the invention for the digital transmission of current measurement values and a battery controller according to the invention comprising a device for receiving a digital transmission of current measurement values.

FIG. 1 shows a battery 1 comprising an inventive device for the digital transmission of current measurement values and an inventive battery controller 10 comprising a device for receiving a digital transmission of current measurement values. The method according to the invention is carried out by the battery shown in FIG. 1 and the battery controller 10 shown in FIG. 1.

The battery 1 is a traction battery of a vehicle in the exemplary embodiment shown. The battery 1 comprises a battery cell 8, by means of which a battery voltage as well as a battery current $I_B$ is provided. A first sensor 2 and a second sensor 3 are disposed consecutively on a line which conducts the battery current $I_B$. The first sensor 2 as well as the second sensor 3 is a current sensor, i.e. a sensor which is suitable for detecting an amplitude of the battery current $I_B$. The amplitude of the battery current $I_B$ is therefore a measurement value detected using the first sensor 2 and the second sensor 3. A result of the arrangement of the first sensor 2 and the second sensor 3 is that the first sensor 2 and the second sensor 3 measure the identical current, i.e. the battery current b.

In the embodiment shown here, the first sensor 2 and the second sensor 3 comprise in each case a Hall sensor. The two Hall sensors are identically constructed and surround the line conducting the battery current $I_B$. An inductive measurement of the battery current $I_B$ then takes place. In alternative embodiments, the first sensor 2 and the second sensor 3 can each comprise a shunt-based sensor. In so doing, a measuring resistor (shunt) is in each case connected in series to the battery cell in order to detect the battery current $I_B$ by means of a voltage drop at the respective measuring resistor.

According to the invention, any combination of sensor types is possible for the first sensor 2 and the second sensor 3. The sensors selected here so as to be identically constructed are however advantageous because said sensors have sensor characteristics that are similar to one another. In this way a deviation between the measurement values acquired by the first sensor 2 and the measurement values acquired by the second sensor 3 at very high or very low temperatures can, e.g., be prevented.

The first sensor 2 generates a first bit sequence which describes the amplitude of the battery current $I_B$ detected using said first sensor 2. The second sensor 3 generates a second bit sequence 20 which describes the amplitude of the battery current $I_B$ detected using said second sensor 3. Because the first sensor 2 and the second sensor 3 are identically constructed in this embodiment, the first bit sequence and the second bit sequence 20 are generated in an identical manner. The first sensor 2 could then, e.g., comprise an AD converter and the second sensor 3 could comprise an AD converter, in order to generate the first bit sequence or, respectively, the second bit sequence 20.

The second sensor 3 is connected to the mirroring unit 4 via an electrically conductive connection, which is suitable for transmitting the second bit sequence 20. The second bit sequence 20 is transmitted from the second sensor 3 to the mirroring unit 4. A mirrored second bit sequence 21 is generated in the mirroring unit 4 by reversing a sequence of the bits provided by the second bit sequence 20.

Figure 2:
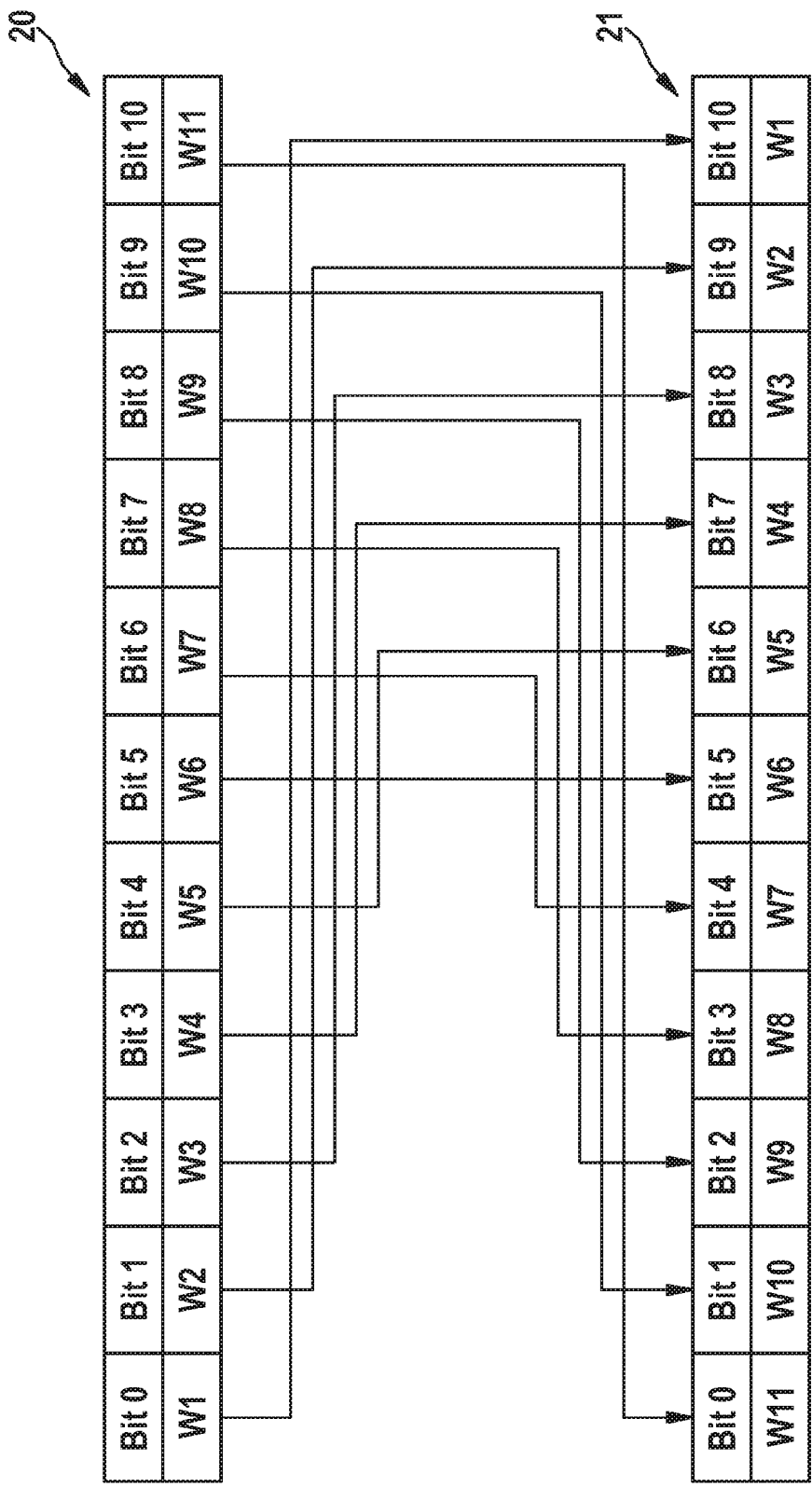
FIG. 2 shows a graphic depiction of a second bit sequence and a mirrored second bit sequence during a mirroring process by means of a mirroring unit.

The process mentioned above is depicted in FIG. 2. The second bit sequence 20 is formed by eleven consecutive bits (bit 0-bit 10). In the embodiment shown here, the bits 0 to 10 of the second bit sequence 20 are transmitted in chronological order from the second sensor 3 to the mirroring unit 4. The bit 0 of the second bit sequence 20 is thus transmitted first and the bit 10 of the second bit sequence 20 is transmitted last. Each of the bits 0 to 10 of the second bit sequence 20 has a bit value. The bit values (i.e. "1" or "0") for the bits 0 to 10 are represented by the values W1 to W11. The mirrored second bit sequence 21 is likewise formed from eleven consecutive bits (bit 0-bit 10). The bit values W1 to W11 of the second bit sequence are associated with said bits 0-10. Because the mirrored second bit sequence 21 is generated by reversing the sequence of the bits provided by the second bit sequence 20, the bit values W1-W11 of the second bit sequence 20 are associated in reversed order with the bits 0-10.

As a result, the bit value W1 of the bit 0 of the second bit sequence 20 is associated with the bit 10 of the mirrored second bit sequence 21. The bit value W2 of the bit 1 of the second bit sequence 20 is associated with the bit 9 of the mirrored second bit sequence 21. The bit value W3 of the bit 2 of the second bit sequence 20 is associated with the bit 8 of the mirrored second bit sequence 21. This process is correspondingly continued until a value is associated with each of the bits 0 to 10 of the mirrored second bit sequence 21.

The mirroring unit 4 could, e.g., consist of a register, into which the second bit sequence 20 is read and which is read out in reversed order in order to generate the mirrored second bit sequence 21. The number of bits in the first, second and mirrored second bit sequence is selected to be eleven bits in this embodiment. A lower or a higher number of bits can also be selected in accordance with a measurement resolution of the first sensor 2 or, respectively, the second sensor 3.

The battery comprises a transmission interface 7. Said interface is formed by a first CAN interface 7a and a second CAN interface 7b in this exemplary embodiment. The first sensor 2 is connected to the first CAN interface 7a via an electrically conductive connection which is suitable for transmitting the first bit sequence. The mirroring unit 4 is connected to the second CAN interface 7b via an electrically conductive connection which is suitable for transmitting the mirrored second bit sequence. The mirrored second bit sequence 21 is transmitted from the mirroring unit 4 to the second CAN interface 7b. The first bit sequence is transmitted from the first sensor 2 to the first CAN interface 7a.

A first data bus is connected to the first CAN interface 7a. This first data bus is a first CAN bus 5. A second data bus is connected to the second CAN interface 7b. This second data bus is a second CAN bus 6. The first bit sequence is transmitted into the first CAN bus 5. The mirrored second bit sequence 21 is simultaneously transmitted into the second CAN bus 6. The individual bits of the first bit sequence and of the mirrored second bit sequence 21 are transmitted in chronological order into the first CAN bus 5 or, respectively, the second CAN bus 6. Simultaneously means that each bit of the first bit sequence is transmitted simultaneously with a bit of the mirrored second bit sequence 21, the position of which in the mirrored second bit sequence 21 corresponds to the position thereof in the first bit sequence.

The first CAN bus 5 and the second CAN bus 6 constitute in each case a data connection to a battery controller 10. The battery 1 can comprise the battery controller 10, or said battery controller can be external to the battery 1 and not a constituent part thereof. The battery controller 10 comprises a receiving interface 11. In this exemplary embodiment, the receiving interface 11 is formed by a third CAN interface 11a and a fourth CAN interface 11b. The first CAN bus 5 is connected to the third CAN interface 11a. The second CAN bus 6 is connected to the fourth CAN interface 11b. The first bit sequence is transmitted via the first CAN bus 5 and decoupled from the same at the third CAN interface 11a. The mirrored second bit sequence 21 is transmitted via the second CAN bus 6 and decoupled from the same at the fourth CAN interface 11b.

The fourth CAN interface 11b is connected to an anti-mirroring unit 12 via an electrically conductive connection which is suitable for transmitting the mirrored second bit sequence 21. The mirrored second bit sequence 21 is transmitted from the fourth CAN interface 11b to the anti-mirroring unit 12. In the anti-mirroring unit 12, the second bit sequence 21 is generated by reversing the sequence of the bits provided by the mirrored second bit sequence 20.

Figure 3:
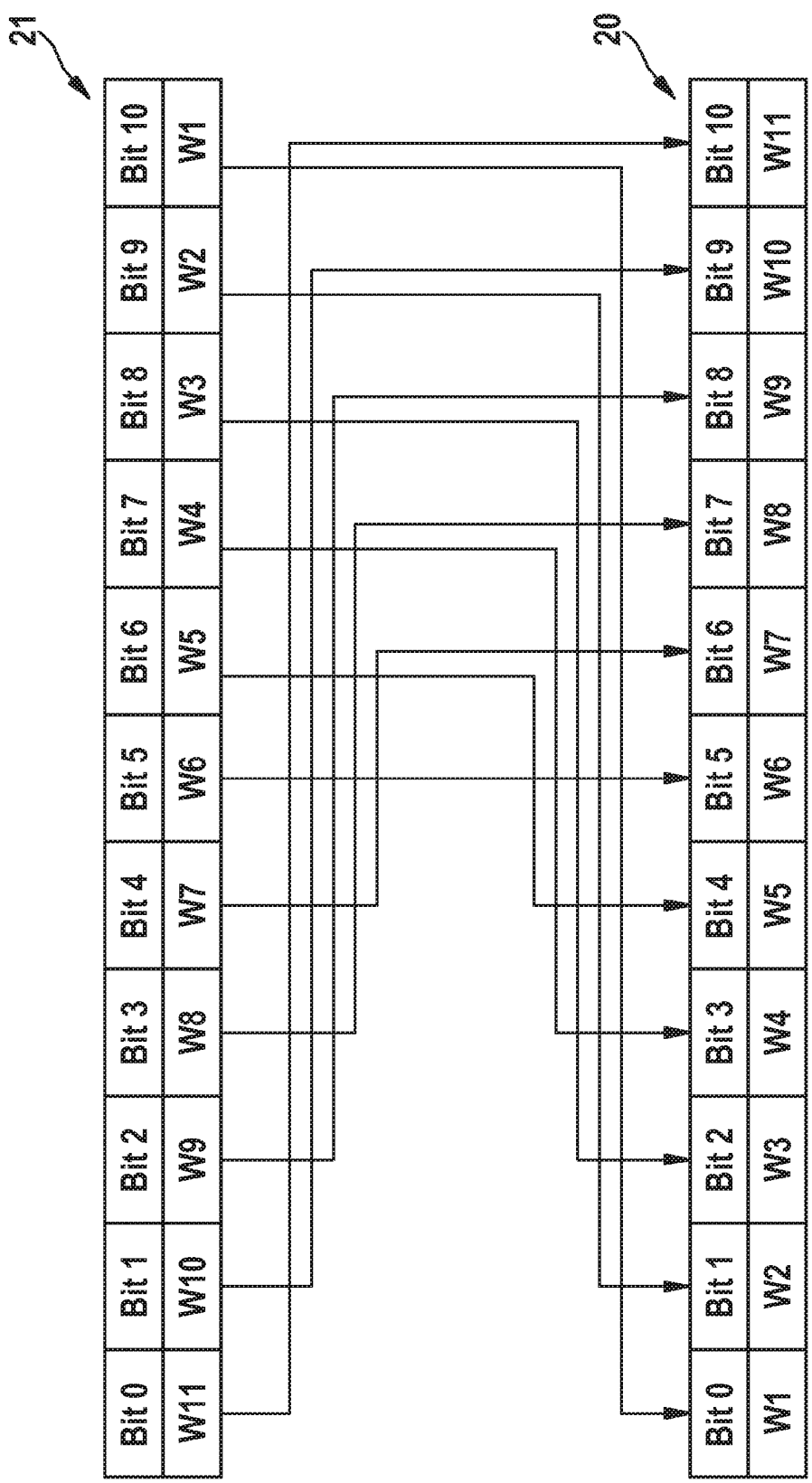
FIG. 3 shows a graphic depiction of a mirrored second bit sequence and a second bit sequence during an anti-mirroring process by an anti-mirroring unit.

The process mentioned above is depicted in FIG. 3. The mirrored second bit sequence 21 is formed from eleven consecutive bits (bit 0-bit 10). In the embodiment shown here, the bits 0 to 10 of the mirrored second bit sequence 21 are transmitted in chronological order from the fourth CAN interface 11b to the anti-mirroring unit 12. Hence, the bit 0 of the mirrored second bit sequence 21 is first transmitted and the bit 10 of said mirrored second bit sequence 21 is transmitted last. Each of the bits 0 to 10 of the mirrored second bit sequence 21 has a bit value. The bit values (i.e. "1" or "0") for the bits 0 to 10 are depicted by the values W1 to W11. The second bit sequence 20 is likewise formed from eleven consecutive bits (bit 0-bit 10). The bit values W1 to W11 of the mirrored second bit sequence 21 are associated with these bits 0-10 of the second bit sequence 20. Because the second bit sequence 20 is generated by reversing the sequence of the bits provided by the mirrored second bit sequence 21, the bit values W1-W11 of the mirrored second bit sequence are associated with the bits 0-10 of the second bit sequence 20 in reversed order.

The bit value W1 of the bit 0 of the mirrored second bit sequence 21 is then associated with the bit 10 of the second bit sequence 20. The bit value W2 of the bit 1 of the mirrored second bit sequence 21 is associated with the bit 9 of the second bit sequence 20. The bit value W3 of the bit 2 of the mirrored second bit sequence 21 is associated with the bit 8 of the second bit sequence 20. This process is correspondingly continued until a value is associated with each of the bits 0 to 10 of the second bit sequence 20. According to the invention, the second bit sequence 20 is therefore generated as it was originally generated by the sensor 3. This is, however, only then the case if a data error does not occur on a transmission path between the second sensor 3 and the anti-mirroring unit 12.

The anti-mirroring unit 12 could, e.g., consist of a register, into which the mirrored second bit sequence 21 is read and which is read in reversed order in order to generate the second bit sequence 20.

The third CAN interface 11a is connected to a control unit 13 via an electrically conductive connection which is suitable for transmitting the first bit sequence. The anti-mirroring unit 12 is connected to the control unit 13 via an electrically conductive connection which is suitable for transmitting the second bit sequence A20. The first bit sequence is transmitted from the third CAN interface 11a to the control unit 13. The second bit sequence 20 is transmitted from the anti-mirroring unit 12 to the control unit 13.

The control unit 13 is equipped to detect a possible error in the first bit sequence or the second bit sequence 20 by comparing the first bit sequence with the second bit sequence 20. To this end, a bitwise comparison of the first bit sequence to the second bit sequence 20 takes place. In the process, the bits of the first bit sequence and of the second bit sequence 20, which correspond to one another in their position in the first or respectively the second bit sequence, are each compared with one another. If a data error has occurred on the first transmission path between the first sensor 2 and the control unit 13 or if a data error has occurred on a second transmission path between the second sensor 3 and the control unit 13, the first bit sequence differs from the second bit sequence at the control unit 13 in at least one bit. The first bit sequence and the second bit sequence are therefore considered faulty if they differ from one another in at least one bit.

With the aid of the system described above, an identical topology of the first and the second sensor is used for the transmission of the first and the second measurement value.

An alternative embodiment corresponds to the first embodiment; however, the control unit 13 is equipped to generate a first analogous value from the first bit sequence and a second analogous value from the second bit sequence and to detect a possible error in the first bit sequence or the second bit sequence 20 by comparing the first analogous value with the second analogous value. The first analogous value can, for example, be generated by a first DA converter, to which the first bit sequence has been supplied as an input signal. The first analogous value corresponds in this exemplary embodiment to the measurement value acquired by the first sensor 2 in the event that a data error has not occurred on the first transmission path. The second analogous value can, for example, be generated by a second DA converter, to which the second bit sequence 20 is supplied as an input signal. The second analogous value then corresponds in this exemplary embodiment to the measurement value acquired by the second sensor 3 in the event that a data error has not occurred on the second transmission path. A possible error in the first bit sequence or the second bit sequence is detected by comparing the first analogous value to the second analogous value. The first bit sequence and the second bit sequence 20 are considered faulty if a difference between the first analogous value and the second analogous value is greater than a predefined threshold value. Such a threshold value is selected in such a way that differences induced by the first and the second sensor 2, 3 between the first and the second measurement value and therefore between the first bit sequence and the second bit sequence 20 are not detected as errors. When the first sensor 2 and the second sensor 3 have a suitable accuracy, the threshold value can also be selected to equal "0".

In a further alternative embodiment, which corresponds substantially to the first embodiment, a LIN bus is used instead of a CAN bus.

Figure 4:
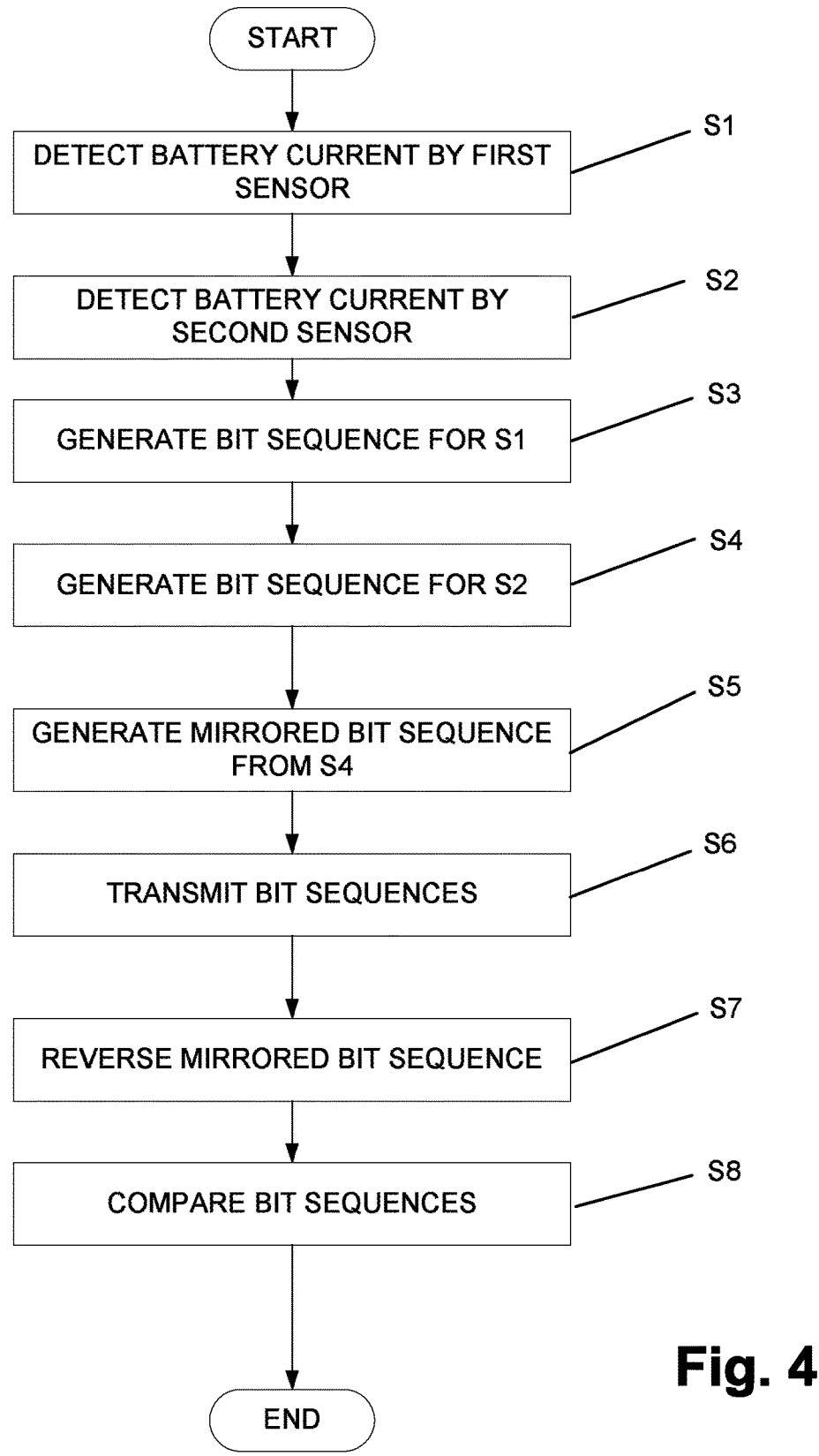
FIG. 4 shows a flow diagram of the method according to the invention for the secured digital transmission of current measurement values.

FIG. 4 shows a flow diagram of the inventive method for the secured digital transmission of current measurement values. The method can be initiated in different ways. The method is preferably initiated by a request signal, which, e.g., is generated by a battery controller. The method is also advantageously carried out at set temporal intervals.

In a first step S1, an amplitude of a battery current $I_B$ in a battery 1 is detected by a first sensor 2. In a second step S2, an amplitude of the battery current $I_B$ in the battery 1 is detected by a second sensor 3. To this end, it is advantageous if the first sensor 2 and the second sensor 3 are sensors identically constructed with regard to detecting the amplitude of the battery current $I_B$ and generating the bit sequence. The first sensor 2 and/or the second sensor 3 particularly comprise(s) a Hall sensor or a shunt-based sensor.

In a third step S3, a first bit sequence is generated which describes the amplitude detected by the first sensor 2. In a fourth step S4, a second bit sequence is generated which describes the amplitude detected by the second sensor 3. The first and the second bit sequence are thus a digital value of the detected amplitude.

In a fifth step S5, a mirrored second bit sequence 21 is generated by reversing a sequence of the bits provided by the second bit sequence, wherein a first bit of the second bit sequence 20 becomes a last bit of the mirrored second bit sequence 21 and a last bit of the second bit sequence 20 becomes a first bit of the mirrored second bit sequence 21. The fifth step S5 can be carried out by a mirroring unit 4 which is equipped for this purpose. Step S5 can likewise be carried out by the second sensor 3. In this case, the second sensor 3 comprises the mirroring unit 4.

In a sixth step S6, a simultaneous transmission of the first bit sequence to a battery controller 10 via a first data bus, e.g. a first CAN bus 5, and of the mirrored second bit sequence 21 to the battery controller 10 via a second data bus, e.g. a second CAN bus 6, takes place. The first data bus or the second data bus is preferably a LIN bus or a CAN bus. In this case, the method accesses transmission protocols specified for these bus systems in order to transmit the first bit sequence and the mirrored second bit sequence 21.

In a seventh step S7, the second bit sequence 20 is generated by reversing a sequence of the bits provided by the mirrored second bit sequence 21, wherein a first bit of the mirrored second bit sequence 21 becomes a last bit of the second bit sequence 20 and a last bit of the mirrored second bit sequence 21 becomes a first bit of the second bit sequence 20.

In an eighth step S8, a possible error is detected in the first bit sequence or the second bit sequence by comparing the first bit sequence with the second bit sequence 20.

Such a comparison carried out in the eighth step S8 can, e.g., can take place by means of a bitwise comparison of the first bit sequence to the second bit sequence 20. In so doing, each bit of the first bit sequence is compared to a bit of the second bit sequence 20 which in the position thereof in the second bit sequence 20 corresponds to the position of said first bit in the first bit sequence. If the two bits which have been compared are not the same, an error in the first or the second bit sequence is then detected.

Such a comparison carried out in the eighth step S8 can be carried out by a first analogous value being generated from the first bit sequence and a second analogous value being generated from the second bit sequence 20 and by a possible error in the first bit sequence or the second bit sequence 20 being detected by comparing the first analogous value with the second analogous value. The first bit sequence and the second bit sequence 20 are therefore converted again into the original value from which these bit sequences were generated. A comparison is made whether these values correspond to one another. If said values do not correspond, an error in the first bit sequence or the second bit sequence is then detected. These values corresponding to one another means that the values are either equal or lie at least in a similar value range, which is defined by a measuring accuracy that is standard for the first sensor 2 and the second sensor 3.

The method is concluded after the after the eighth step S8 has been completed.

All of the embodiments of the invention have the advantage that not only data errors can be inferred in the first or in the second transmission path but also a degree of reliability of the measurement values detected using the first sensor 2 and the second sensor 3 can be inferred from an error in the first bit sequence or in the second bit sequence 20. A deviation between the first measurement value acquired by the first sensor 2 and the second measurement value acquired by the second sensor 3 is recognized as an error in one of the bit sequences, and the corresponding measurement values can therefore be classified as unreliable.

Irrespective of which bus system is used, it is possible to couple a plurality of first sensors 2 and a plurality of second sensors 3, which detect different battery currents $I_B$, to a first data bus and a second data bus in a manner in accordance with the invention. The receiving interface 11 could in this case comprise a first bus controller for the first data bus and a second bus controller for the second data bus.

The invention claimed is:

1. A battery (1) having a device for the digital transmission of current measurement values, comprising:
    a first sensor (2) for detecting an amplitude of a battery current ($I_B$) and which generates a first bit sequence which describes the amplitude detected using the first sensor (2);
    a second sensor (3) for detecting the amplitude of the battery current ($I_B$) and which generates a second bit sequence (20) which describes the amplitude detected using the second sensor (3);
    a mirroring unit (4) coupled to the second sensor (3) such that the second bit sequence (20) is transmitted from the second sensor (3) to said mirroring unit and which generates a mirrored second bit sequence (21) by reversing a sequence of the bits provided by the second bit sequence (20), wherein a first bit of the second bit sequence (20) becomes a last bit of the mirrored second bit sequence (21) and a last bit of the second bit sequence (20) becomes a first bit of the mirrored second bit sequence (21); and
    a transmission interface (7) which is equipped to facilitate a simultaneous coupling of the first bit sequence from the first sensor (2) into a first data bus (5) and the mirrored second bit sequence (21) from the mirroring unit (4) into a second data bus (6).

2. The battery according to claim 1, characterized in that the first sensor (2) and the second sensor (3) are identically constructed sensors with regard to detecting the amplitude of the battery current ($I_B$) and generating the bit sequence.

3. The battery according to claim 1, characterized in that the first data bus (5) and/or the second data bus (6) is a LIN bus or a CAN bus.

4. The battery according to claim 1, characterized in that the first sensor (2) and/or the second sensor (3) comprise(s) a Hall sensor or a shunt-based sensor.

5. The battery according to claim 1, wherein the second sensor (3) comprises the mirroring unit (4).

6. A battery controller (10) having a device for receiving a digital transmission of current measurement values, comprising:
    a receiving interface (11) which decouples a first bit sequence from the a first data bus (5) and simultaneously decouples a mirrored second bit sequence (21) from a second data bus (6);
    an anti-mirroring unit (12) which generates a second bit sequence (20) by reversing a sequence of the bits provided by the mirrored second bit sequence (21), wherein a first bit of the mirrored second bit sequence (21) becomes a last bit of the second bit sequence (20) and a last bit of the mirrored second bit sequence (21) becomes a first bit of the second bit sequence (20); and
    a control unit (13) which is equipped to detect a possible error in the first bit sequence or the second bit sequence (20) by comparing the first bit sequence with the second bit sequence (20).

7. The battery controller according to claim 6, characterized in that the control unit (13) is equipped to detect a possible error in the first bit sequence or the second bit sequence (20) by a bitwise comparison of the first bit sequence with the second bit sequence (20).

8. The battery controller according to claim 6, characterized in that the control unit (13) is equipped:
    to generate a first analogous value from the first bit sequence and to generate a second analogous value from the second bit sequence (20); and
    to detect a possible error in the first bit sequence or the second bit sequence (20) by comparing the first analogous value with the second analogous value.

9. The battery controller (10) according to claim 6, characterized in that the first data bus (5) and/or the second data bus (6) is/are a LIN bus or a CAN bus.

10. A method for the secured digital transmission of current measurement values, the method comprising:
    detecting (S1) an amplitude of a battery current ($I_B$) in a battery (1) using a first sensor (2);
    detecting (S2) the amplitude of the battery current ($I_B$) in the battery (1) using a second sensor (3);
    generating (S3) a first bit sequence which describes the amplitude detected using the first sensor (2);
    generating (S4) a second bit sequence which describes the amplitude detected using the second sensor (3);
    generating (S5) a mirrored second bit sequence (21) by reversing a sequence of the bits provided by the second bit sequence, wherein a first bit of the second bit sequence (20) becomes a last bit of the mirrored second bit sequence (21) and a last bit of the second bit sequence (20) becomes a first bit of the mirrored second bit sequence (21);

simultaneously transmitting (S6) the first bit sequence via a first data bus (5) to a battery controller (10) and the mirrored second bit sequence (21) via a second data bus (6) to the battery controller (10);

generating (S7) the second bit sequence (20) by reversing a sequence of the bits provided by the mirrored second bit sequence, wherein a first bit of the mirrored second bit sequence (21) becomes a last bit of the second bit sequence (20) and a last bit of the mirrored second bit sequence (21) becomes a first bit of the second bit sequence (20); and detecting (S8) a possible error in the first bit sequence or the second bit sequence (20) by comparing the first bit sequence with the second bit sequence (20).

* * * * *